United States Patent [19]

Foster

[11] Patent Number: 4,657,574
[45] Date of Patent: Apr. 14, 1987

[54] MOULD PORTION WITH COOLING MEANS FOR USE IN MOULDING MOLTEN GLASS

[75] Inventor: Thomas V. Foster, Doncaster, England

[73] Assignee: Emhart Industries, Inc., Farmington, Conn.

[21] Appl. No.: 821,944

[22] Filed: Jan. 24, 1986

[30] Foreign Application Priority Data

Jan. 26, 1985 [GB] United Kingdom ............... 8501993

[51] Int. Cl.$^4$ .......................... C03B 9/38; C03B 11/12
[52] U.S. Cl. ........................................ 65/265; 65/267; 65/319; 65/356
[58] Field of Search ............... 65/182.3, 182.5, 374.15, 65/362, 83, 265, 267, 319, 356

[56] References Cited

U.S. PATENT DOCUMENTS

| | | | |
|---|---|---|---|
| 3,171,731 | 3/1965 | Barger et al. | 65/356 X |
| 3,202,498 | 8/1965 | Torok | 65/362 |
| 3,224,860 | 12/1965 | Stinnes | 65/362 X |
| 3,258,324 | 6/1966 | Torok | 65/356 |
| 3,288,629 | 11/1966 | McCreight | 65/374.15 |
| 3,644,110 | 2/1972 | Sendt | 65/356 X |
| 3,761,220 | 9/1973 | Dirne | 65/356 X |
| 4,125,387 | 11/1978 | Gunter | 65/356 X |
| 4,313,751 | 2/1982 | Torok | 65/319 X |

Primary Examiner—Arthur Kellogg
Attorney, Agent, or Firm—H. Samuel Kieser

[57] ABSTRACT

A mould portion (10) has one or more inner surfaces (16,18) arranged to define a portion of a mould cavity (14) in which molten glass can be moulded. A rod (20) of a material having a higher thermal conductivity than the remainder of the mould portion extends from a region (22) of the mould portion requiring enhanced heat extraction into a recess (24) in an outer surface (26) of the mould portion. A passage (28) extends through the mould portion (10) and enters the recess (24). Cooling fluid, for example air, can be caused to flow through the passage so that the fluid enters the recess and cools the rod.

4 Claims, 1 Drawing Figure

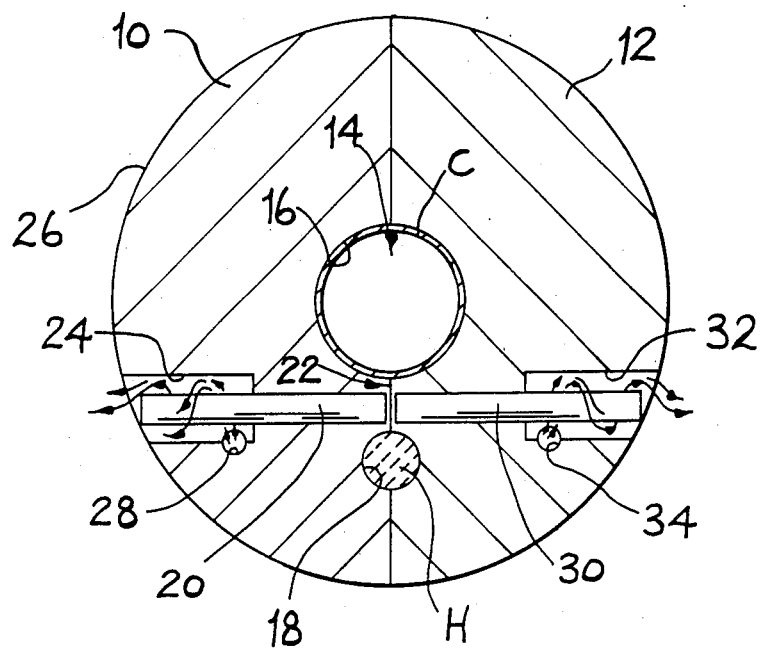
*Figure*

MOULD PORTION WITH COOLING MEANS FOR USE IN MOULDING MOLTEN GLASS

BACKGROUND OF THE INVENTION

This invention is concerned with a mould portion for use in moulding molten glass in the manufacture of glass containers. The mould portions used in the manufacture of glass containers have one or more inner surface portions arranged to define a portion of a mould cavity in which molten glass can be moulded. Typically, a mould consists of three portions, two side portions and a bottom plate. The side portions have inner surface portions arranged to define side portions of the cavity of the mould in which molten glass can be moulded and the side portions are movable to allow removal of completed mouldings from the mould cavity. Since the heat absorbed by the mould portions from the molten glass is greater than can be dissipated to the surrounding atmosphere without forced cooling, it is common practice to provide cooling for the mould portions either by blowing air on to the outsides of the mould portions or by passing cooling fluid, usually air, through passages formed in the mould portions. European patent specification No. 0102820 describes an arrangement in which cooling passages in the mould portions are supplied with cooling air from a plenum chamber arranged below the mould portions.

In the manufacture of certain glass containers it is necessary to provide enhanced heat extraction from a portion of the mould portion adjacent the glass-contacting surface thereof. This occurs when the concentration of molten glass is greater in one area of the mould portion than others. For example, where a container having a handle is being moulded, the portion of the mould portion which is encircled by molten glass forming the container and the handle requires enhanced heat extraction. In order to achieve this enhanced heat extraction it is known to provide a rod of a material having a higher thermal conductivity than the remainder of the mould portion, the rod may, for example, be made of copper. This rod extends from the region of the mould portion requiring enhanced heat extraction into a recess in an outer surface of the mould portion. This recess is open to the atmosphere and air is blown into the recess to cool the free end of the rod. Thus, a path of high thermal conductivity is formed between the cooling air entering the recess and the region requiring high heat extraction. The recess may be in the form of a slot cut into the mould portion but the cooling air enters the slot radially of the mould portion and passes the exposed end of the rod in a way which does not remove heat from the rod in a particularly efficient manner.

It is an object of the present invention to provide a mould portion having a rod as mentioned above in which the rod is more efficiently cooled.

BRIEF SUMMARY OF THE INVENTION

The invention provides a mould portion for use in moulding molten glass in the manufacture of glass containers, the mould portion having one or more inner surface portions arranged to define a portion of a mould cavity in which molten glass can be moulded, the mould portion comprising a rod of a material having a higher thermal conductivity than the remainder of the mould portion, the rod extending from a region of the mould portion requiring enhanced heat extraction into a recess in an outer surface of the mould portion, wherein a passage extends through the mould portion and enters said recess, the arrangement being such that causing cooling fluid to flow through the passage causes the fluid to flow through the recess thereby cooling the rod.

In a mould arrangement in accordance with the last preceding paragraph, the cooling fluid passing the exposed end of the rod can be caused to swirl around the rod providing efficient cooling thereof. Furthermore, the flow of cooling fluid through the passage and into the recess can be precisely controlled by varying the pressure applied to the cooling fluid or by varying the period in each moulding cycle in which the cooling fluid is caused to flow. Furthermore, a through-flow situation is created which allows greater flow than when air is blown into a closed recess.

Preferably, the recess is cylindrical and the passage enters the recess tangentially so that a swirling motion of the cooling fluid is encouraged.

Preferably, the passage extends upwardly through the mould portion from an entrance in a bottom surface of the mould portion. This arrangement allows the cooling fluid to be supplied by an arrangement similar to that described in European patent specification No. 0102820.

The rod may be made of copper which has a substantially higher thermal conductivity than the cast iron generally used for manufacturing the remainder of the mould.

BRIEF DESCRIPTION OF THE DRAWING

There now follows a detailed description, to be read with reference to the accompanying drawing of a mould portion which is illustrative of the invention. It is to be understood that the illustrative mould portion has been selected for description by way of example and not of limitation of the invention.

The drawing is a horizontal cross-sectional view taken through the illustrative mould portion and a mould portion which co-operates with the illustrative mould portion in defining a mould cavity.

DETAILED DESCRIPTION OF PREFERRED EMBODIMENT OF THE INVENTION

The illustrative mould portion 10 is for use in moulding molten glass in the manufacture of glass containers. The mould portion 10 is the side portion of a mould which co-operates with a further side portion 12 and with a bottom plate (not shown) to define a mould cavity 14 in which a glass container having a handle can be moulded. The mould portion 10 has an inner surface 16 which is arranged to define a portion of the mould cavity 14 in which the molten glass forming the container can be moulded and an inner surface 18 arranged to define a portion of the mould cavity 14 in which the handle of the container can be moulded. The drawing shows the container C in the mould cavity and the handle H is also indicated. The portion of the mould cavity 14 which moulds the container C is defined by the side portions 10 and 12 and the bottom plate aforementioned while the portion which forms the handle H is defined only by the side portions 10 and 12.

The mould portion 10 comprises a cylindrical rod 20 of a material having a higher thermal conductivity than the remainder of the mould portion, the remainder of the mould portion being formed of cast iron while the rod is formed of copper. The rod 20 extends from a region 22 of the mould portion 10 which requires enhanced heat extraction, the enhanced heat extraction being required because the region 22 is surrounded by molten glass when a container is being formed as the region is encircled by the container C and its handle H, the region 22 thus being an island surrounded by molten glass when moulding is taking place and therefore receiving heat from all directions. The rod 20 extends into a cylindrical recess 24 formed in an outer surface 26 of the mould portion 10. The rod 20 enters the recess longitudinally and centrally thereof and does not extend beyond the outer surface 26 of the portion 10. A cylindrical passage 28 extends vertically through the mould portion 10 and enters the recess 24. The passage 28 has an entrance (not shown) in a bottom surface of the mould portion 10 and this entrance communicates (possibly through a vertical passage formed in the bottom plate) with a supply of air under pressure. If desired, the supply of air under pressure can be a plenum chamber such as those described in the aforementioned European patent specification No. 0102820. The central axis of the passage 28 is arranged to be at the same distance from the central axis of the recess 24 as the radius of the recess 24 so that the passage 28 enters the recess 24 tangentially.

The mould portion 12 also comprises a copper rod 30 similar to the rod 20 extending into a cylindrical recess 32 which is entered tangentially by a passage 34. The rod 30 extends from the region 22 to the recess 32. When the mould formed by the mould portions 10 and 12 is in use, air under pressure is blown into the passages 28 and 34. The air enters the recesses 24 and 32 and swirls around the free end portions of the rods 20 and 30 (as indicated by the arrows in the drawing) so that the end portions of the rods 20 and 30 are efficiently cooled and the heat extraction from the region 22 is enhanced. The duration of air flow in each moulding cycle can be controlled by the valves described in the aforementioned European patent specification or by other suitable means. Alternately, the passages 28 and 34 may be connected to an air supply which is variable to control the air flow through the passages and hence the cooling of the rods 20 and 30. Furthermore, it is possible to suck air from the passages 28 and 34 to cause cooling fluid to flow through them so that air is sucked into the recesses 24 and 32 cooling the rods 20 and 30 before exiting through the passages 28 and 34.

I claim:

1. A mould portion for use in moulding molten glass in the manufacture of glass containers, the mould portion having one or more inner surface portions arranged to define a portion of a mould cavity in which molten glass can be moulded, the mould portion comprising a rod of a material having a higher thermal conductivity than the remainder of the mould portion, the rod extending from a region of the mould portion requiring enhanced heat extraction into a recess in an outer surface of the mould portion, wherein a passage extends through the mould portion and enters said recess, the arrangement being such that causing cooling fluid to flow through the passage causes the fluid to flow through the recess thereby cooling the rod.

2. A mould portion according to claim 1, wherein the recess is cylindrical and the passage enters the recess tangentially.

3. A mould portion according to claim 1, wherein the passage extends upwardly through the mould portion from an entrance in a bottom surface of the mould portion.

4. A mould portion according to claim 1, wherein the rod is made of copper.

* * * * *